Jan. 14, 1964 T. P. TYSON 3,117,487
METHOD OF DETERMINING SPEED OF A MOVING OBJECT
Original Filed Dec. 8, 1960 2 Sheets-Sheet 1
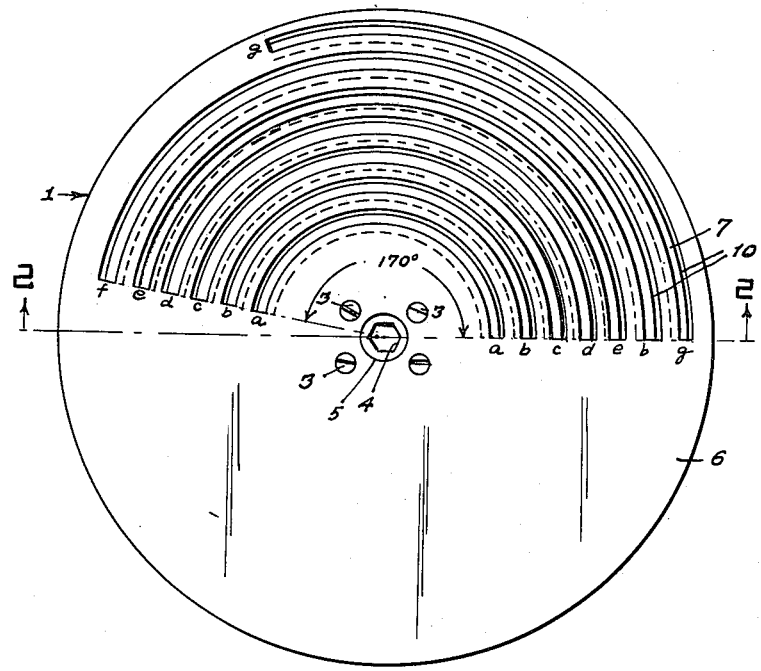
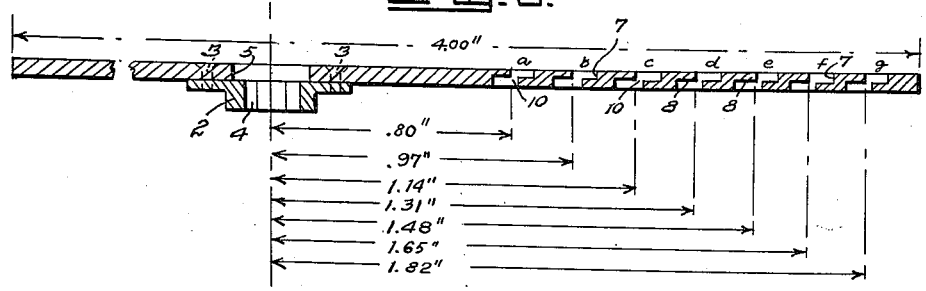
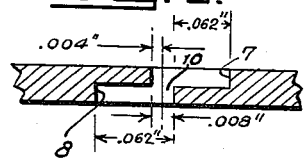
INVENTOR.
Thomas P. Tyson
BY
S. J. Rotondi & A. J. Dupont Jan. 14, 1964  T. P. TYSON  3,117,487
METHOD OF DETERMINING SPEED OF A MOVING OBJECT
Original Filed Dec. 8, 1960  2 Sheets-Sheet 2

INVENTOR.
Thomas P. Tyson
BY
S. J. Rotondi & A. T. Dupont

United States Patent Office 3,117,487
Patented Jan. 14, 1964

3,117,487
METHOD OF DETERMINING SPEED OF A
MOVING OBJECT
Thomas P. Tyson, Trailer Court 6, Space 11,
White Sands Missile Range, N. Mex.
Original application Dec. 8, 1960, Ser. No. 74,739, now
Patent No. 3,015,986, dated Jan. 9, 1962. Divided
and this application Oct. 13, 1961, Ser. No. 152,113
1 Claim. (Cl. 88—16)
(Granted under Title 35, U.S. Code (1952), sec. 266)

The invention described herein may be manufactured and used by or for the Government for governmental purposes without the payment to me of any royalty thereon.

This case is a division of Serial No. 74,739, filed December 8, 1960, now Patent No. 3,015,986 issued January 9, 1962.

This invention relates to a method of determining the speed of a moving object and more particularly to a method for furnishing data in photographic form from which the speed of a moving object such as a missile may be determined from a single frame of a motion picture film.

The method of the invention may be used with any motion picture camera which is fitted with a rotating disc type shutter.

The present invention employs a disc type shutter made of 20-gauge brass in which the apertured or exposure area consists of spiral grooves which are formed on both sides of the disc, the grooves on one side of the disc overlapping the grooves on the other side by eight thousandths of an inch. The aperture, per se, is eight thousandths of an inch in width. Each aperture increases 0.17 of an inch in radius while turning from right to left. The inside aperture begins on a radius of 0.80 of an inch from the center and increases to 0.97 of an inch at 170°. The next aperture starts at 0.97 of an inch and increases to 1.14 of an inch. In this manner each aperture (except the last) will expose 0.17 of an inch of film of each frame. The aperture width of eight thousandths of an inch on the radius will be equal to a sectorial shutter aperture width of 8°.

If the shutter of the camera used is one hundred percent efficient, the exposure time given by the 8-degree spiraled aperture of the invention will be 21.25 times faster than the sweep or total time the frame is being exposed. In this case a frame rate of 60 frames per second would furnish an exposure time of 0.37 millisecond for the 8-degree spiraled aperture and 7.9 milliseconds for the sweep or total exposure time. (Exposure time of 0.37 millisecond refers to an object at rest. For an object in motion, the exposure time will be more than 0.37 millisecond.)

If the high speed camera used is located or positioned to photograph a missile of which the image moves through the frame along the radius of the shutter disc, one or more parts of the image will be photographed. Most important factors in the final result are:

(1) The number of frames per second at which the camera is run.
(2) The speed of the image across the film plane.
(3) The position of the missile on the frame.
(4) The distance of the spiraled aperture shutter from the film plane.
(5) The aperture of the camera lens.

Once the broken image is obtained, the frame may be placed in a device which is a replica of the apertured shutter and viewed through a film enlarger for measurement of the distance between the broken images and the angle of rotation of the spiraled aperture during exposure of the last image. Distance of separation of images can be stated in terms of missile diameters. Time of motion between exposures can be taken from the angle of shutter rotation when the known frames per second of a camera powered by a synchronous motor is used.

The object of this invention is to collect data in photographic form from which the speed of a moving object may be determined from a single frame of motion picture film.

Further objects will become evident as the description of the invention proceeds.

Referring to the drawings:

FIG. 1 is a top plan view of a spiraled shutter disc constructed in accordance with the invention;

FIG. 2 is an enlarged cross section view of the disc of FIG. 1 taken along lines 2—2 of FIG. 1;

FIG. 3 is a fragmentary enlarged detail view showing one of the grooves;

Figure 4:
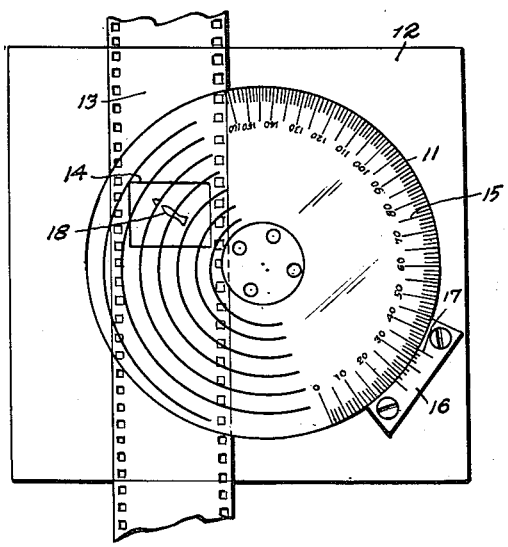
FIG. 4 is a plan view of the spiraled aperture data reducing device, the transparent film print being oriented with respect to the broken image on the film frame.

Referring more particularly to the drawing 1 represents the spiraled aperture shutter of the invention in its entirety. The shutter is provided with a hub 2 (see FIG. 2) secured centrally to the shutter by screws 3. Shutter 1 is provided with a hexagonal opening 4 for mounting it on the shaft (not shown) of a high speed motion picture camera. Shutter 1 is also provided with an opening 5 registering with opening 4 for mounting purposes.

Shutter 1 consists of a 20-gauge brass disc 6 having a diameter of 4 inches. Spiraled grooves 7 are cut on the top side of the disc 6 and are seven in number. These grooves are cut only along the 170° area used for the exposure area of disc 6 as shown in FIG. 1 and are of a depth equal to one-half of the thickness of disc 6.

Similar spiraled grooves 8 are cut on the bottom side of disc 6, also of a depth equal to one-half of the thickness of disc 6, as best viewed in FIGS. 2 and 3.

Grooves 8 are offset from grooves 7 by .008 of an inch as seen in FIG. 3.

Spiraled apertures 10 are then formed between the grooves 7 and 8 and are of a width of .008 of an inch.

For the purpose of identification, apertures 10 are indicated as $a, b, c, d, e, f$, and $g$ on FIGS. 1 and 2.

The inside aperture $a$ begins on a radius of 0.80 inch from the center and increases to 0.97 inch at 170 degrees. The next aperture $b$ starts at 0.97 inch and increases to 1.14 inches.

In this manner each aperture, except $g$ (the outer one) will expose 0.17 inch of film of each frame.

After the broken image has been obtained on the film of the high speed camera (not shown) the results may be reduced by measurement of the distance between the two parts of the image and the angle of rotation of the spiraled aperture during exposure of the last image.

A method of accomplishing this reduction of data is shown diagrammatically in FIGS. 4–7. A transparent film print 11 is made and this print is a replica of the camera shutter 1. This film is rotatably mounted on a holder 12 in the same manner as shutter 1 is mounted on the camera (not shown).

Portions representing the spiraled aperture 10 are opaque.

After exposure, film 13 of the broken image is then placed over an aperture 14 in holder 12 and under print 11. The assembled device is then mounted on an enlarger (not shown) having a ground glass viewing screen of standard type.

The transparent film 11 is also circular as is the shutter 1 and is graduated from 0–170° as at 15, and a vernier 16 is provided having graduation 17 of 0.10 degree.

18 denotes the image to be measured, a missile being shown by way of example.

Figure 6:
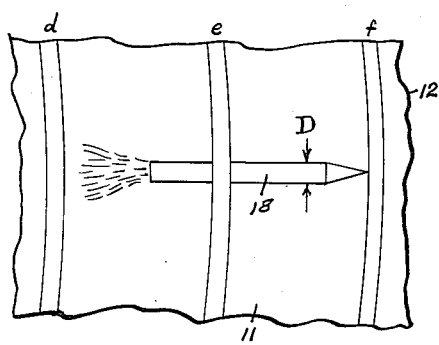
FIG. 6 is a greatly enlarged detail view showing the image with relation to the reducing device as seen in FIG. 5.
Figure 7:
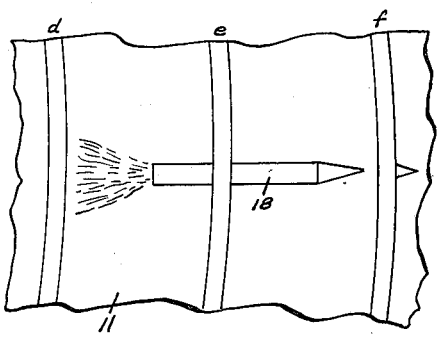
FIG. 7 is a similar view illustrating the movement of the image during exposure of approximately 0.009 of an inch as seen in FIG. 4.

FIGS. 6 and 7 show the broken image 18 on a greatly enlarged scale.

*Computing Image Speed*

The method of computing the image speed may now be accomplished as follows:

The enlarged diameter D (see FIG. 6) is carefully measured and found, by way of example, to be 0.14 inch. Tip to tip of the broken missile image is 0.20 inch. If the known image diameter is 8 inches, the distance of travel is 11.45 inches or 0.954 foot.

Assuming film speed to be at the rate of 60 frames per second, and a complete 360 degree shutter rotation in $\frac{1}{60}$ second or 16.67 milliseconds per 360 degrees. Using FIGS. 4 and 5 as illustrations, a rotation of 62 degrees and an elapsed time of 2.87 milliseconds will be found. The image speed is therefore 332 feet per second.

*Shutter Efficiency for Focal Plane Shutters*

Exposure for a moving object depends on the slit width, the lens aperture or $f$/stop and the distance of the shutter from the focal plane. In the foregoing problem the correct image exposure would be 0.37 millisecond. The correct $f$/stop setting for 0.37 millisecond would give the desired film density. For an object in motion the exposure time will be somewhat different.

Let:

$a$ = distance of shutter from focal plane;
$s$ = slit width;
$f$ = $f$/stop member;
$T$ = time of exposure for a 100% efficient shutter; and
$t$ = amount of time added to T.

The slit width of the spiraled aperture increases with the increase of radius length from the center of the aperture. A proportional increase in shutter efficiency will be realized for the longer radius.

Figure 5:
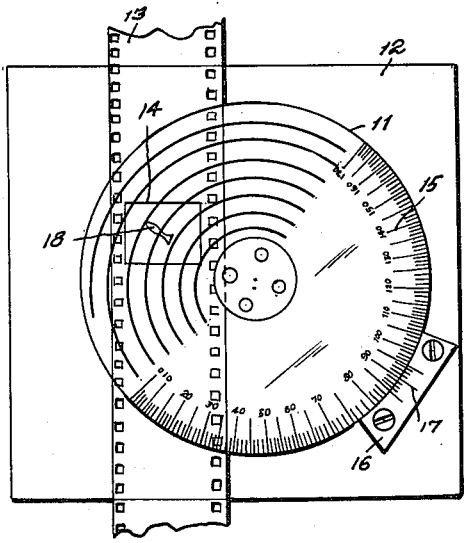
FIG. 5 is a view similar to FIG. 4 showing the reducing device rotated for measuring the distance between the broken parts of the image.

FIGS. 4 and 5 show the image 18 as approximately 1.56 inches from center.

2 sine $4° \times 1.56 = 0.218$ inch and is the width of a sectorial shutter at this point.

Use $$t = \frac{Ta}{sf}$$

in which $a = 0.25$ of an inch for a high speed 35 mm. camera. Operated at 60 frames per second at a lens aperture of $f/16$ we find:

$$t = \frac{3.7 \times 10^{-4} \times 2.5 \times 10^{-1}}{2.18 \times 10^{-1} \times 1.6 \times 10} = 2.64 \times 10^{-5} \text{ seconds}$$

to be added to the ideal speed of 0.37 millisecond. This small increase in exposure time is negligible.

Operated at a lens aperture of $f/2.8$ the ideal exposure time of 0.37 millisecond or $\frac{1}{2700}$ second changes to 0.52 millisecond or $\frac{1}{1900}$ second real exposure time for a moving object. Some consideration should be given to movement of objects travelling at high speeds of say, 2000 feet per second. In a setup on the range where the object distance is 500 feet; using a 35 mm. high speed camera with a frame rate of 60 frames per second;

Magnification for a 6 inch lens is in this case $\frac{1}{1000}$.
Image moves across the frame at 2 feet per second.
Time of exposure 0.37 millisecond.

Movement of image during exposure is about 0.009 inch or ¼ millimeter image resolution of 4 lines per millimeter is in any case below standard but since the two missile tips shown in FIGS. 6 and 7 received the same exposure in every way, an accurate measurement is possible.

These calculations show spiraled apertures of even less than 0.008 inch are feasible. A shutter efficiency of 50 percent on a spiraled aperture radius of 1 inch; where $a = 0.25$ of an inch and $f = 2.8$, would require a sectorial shutter of about 5 degrees. Operated at 60 frames per second an ideal exposure time of $\frac{1}{4300}$ of a second will be found, while the real, or object stopping time, will be $\frac{1}{2150}$ of a second. Decreasing the sectorial aperture below 5 degrees will not aid in stopping motion.

If, however, in the above calculations, $a = 0.1$ of an inch, real or stopping time instead of being $\frac{1}{2150}$ of a second changes to $\frac{1}{4200}$ of a second and the same spiraled aperture becomes very near to being 100 percent efficient.

The above calculations point out the importance of placing the focal plane shutter as close to the film lane as is practical.

Variations and modifications may be effected without departing from the scope of the novel concept of the present invention as defined in the claim.

What is claimed is:

A method of determining the speed of a moving object comprising the steps of:

(a) substituting a disc type shutter of a high speed motion picture camera with a shutter having a spiraled aperture in its exposure area;

(b) rotating said spiraled apertured shutter;

(c) photographing a broken image of a moving object through said shutter, while it is rotating, on said film;

(d) preparing a transparent replica of said spiral apertured shutter whereby the spiraled aperture of said shutter appears opaque on said replica;

(e) placing said film containing said broken image in a holder having an aperture equal in area to a single frame of said film and positioning said holder whereby said single frame of said film is in registry with said aperture in said holder;

(f) rotatably mounting said replica on said holder and over said single frame of said film whereby the exposure area of said replica overlaps said photographed broken image in said single frame of said film, then, (g) rotating said replica with respect to said broken image to calculate the speed of said moving object.

References Cited in the file of this patent
UNITED STATES PATENTS

| | | |
|---|---|---|
| 1,011,593 | Dudley | Dec. 12, 1911 |
| 1,375,375 | Frist | Apr. 19, 1921 |
| 2,250,442 | Abell | July 29, 1941 |
| 2,663,217 | Tuttle et al. | Dec. 22, 1953 |